(12) United States Patent
Randall (10) Patent No.: US 9,830,440 B2
(45) Date of Patent: Nov. 28, 2017

(54) BIOMETRIC VERIFICATION USING PREDICTED SIGNATURES

(71) Applicant: Barclays Bank PLC, London (GB)

(72) Inventor: Lee Randall, Princes Risborough (GB)

(73) Assignee: Barclays Bank PLC, London (GB)

( * ) Notice: Subject to any disclaimer, the term of this patent is extended or adjusted under 35 U.S.C. 154(b) by 0 days.

(21) Appl. No.: 14/038,073

(22) Filed: Sep. 26, 2013

(65) Prior Publication Data

US 2015/0067822 A1    Mar. 5, 2015

(30) Foreign Application Priority Data

Sep. 5, 2013   (GB) .................................. 1315843.1

(51) Int. Cl.
  *G06F 21/32*   (2013.01)
  *G10L 17/04*   (2013.01)
  *G10L 25/51*   (2013.01)

(52) U.S. Cl.
  CPC .............. *G06F 21/32* (2013.01); *G10L 17/04* (2013.01); *G10L 25/51* (2013.01)

(58) Field of Classification Search
  CPC ........... G06F 21/32; G06F 21/321; G10L 7/04
  See application file for complete search history.

(56) References Cited

U.S. PATENT DOCUMENTS

| | | | |
|---|---|---|---|
| 6,107,935 A * | 8/2000 | Comerford et al. | 340/5.52 |
| 6,311,272 B1 * | 10/2001 | Gressel | G06K 9/00885 |
| | | | 380/258 |
| 6,327,565 B1 | 12/2001 | Kuhn et al. | |
| 6,442,519 B1 * | 8/2002 | Kanevsky et al. | 704/243 |
| 6,519,561 B1 | 2/2003 | Farrell et al. | |
| 6,804,647 B1 | 10/2004 | Heck et al. | |
| 7,209,881 B2 * | 4/2007 | Yoshizawa | G10L 15/20 |
| | | | 704/233 |
| 8,417,525 B2 | 4/2013 | Daye et al. | |
| 8,775,187 B2 * | 7/2014 | Summerfield | G06F 21/32 |
| | | | 704/273 |

(Continued)

FOREIGN PATENT DOCUMENTS

| | | |
|---|---|---|
| JP | 2014170488 A  * | 9/2014 |
| WO | WO 99/23643 | 5/1999 |
| WO | WO 02/078249 | 10/2002 |

*Primary Examiner* — Eleni Shiferaw
*Assistant Examiner* — Alexander Lapian
(74) *Attorney, Agent, or Firm* — Cowan, Liebowitz & Latman, P.C.; Steven D. Underwood (57) ABSTRACT

A computer-implemented biometric identity verification method including the steps of storing a database of registered users, including data identifying profile attributes of each registered user and a respective plurality of stored biometric signatures, each stored biometric signature associated with a corresponding one or more of the profile attributes. A predicted biometric signature is derived for a requesting user when it is determined that a period of time has elapsed since the requesting user's stored biometric signature was last updated, by adapting the stored biometric signature based on biometric variances derived from a biometric peer group of registered users with at least one profile attribute in common with the requesting user. The predicted biometric signature is used to verify the identity of the requesting user.

36 Claims, 4 Drawing Sheets

(56) References Cited

U.S. PATENT DOCUMENTS

| | | |
|---|---|---|
| 8,925,058 B1* | 12/2014 | Dotan ................. H04L 63/0861 |
| | | 713/186 |
| 2004/0122669 A1 | 6/2004 | Aronowitz |
| 2005/0075875 A1* | 4/2005 | Shozakai et al. ............. 704/231 |
| 2005/0143996 A1* | 6/2005 | Bossemeyer, Jr. ...... G10L 17/08 |
| | | 704/247 |
| 2008/0077359 A1* | 3/2008 | Ito .......................... G06F 21/32 |
| | | 702/187 |
| 2010/0225443 A1* | 9/2010 | Bayram ................ G06F 21/316 |
| | | 340/5.83 |
| 2010/0232653 A1* | 9/2010 | Muquit et al. ................ 382/116 |
| 2010/0305946 A1* | 12/2010 | Gutierrez et al. ............ 704/246 |
| 2011/0196676 A1* | 8/2011 | Daye et al. ................... 704/244 |
| 2012/0316876 A1* | 12/2012 | Jang et al. .................... 704/246 |
| 2013/0159194 A1 | 6/2013 | Habib |
| 2013/0340061 A1* | 12/2013 | Tsukamoto ............. G06F 21/32 |
| | | 726/7 |
| 2014/0375786 A1* | 12/2014 | Mankowski ....... G06K 9/00033 |
| | | 348/77 |

* cited by examiner

BIOMETRIC VERIFICATION USING PREDICTED SIGNATURES

FIELD OF THE INVENTION

This invention relates to user verification based on biometric signatures, and more particularly to deriving predicted biometric signatures that are processed by computer systems.

BACKGROUND OF THE INVENTION

The problem of divergence between stored and "live" biometric profiles has been known for some time. In known biometric verification systems, an individual's biometric signature is typically updated or refreshed after a verified contact with that individual. For example, U.S. Pat. No. 8,417,525 discusses a technique that stores several biometric patterns for a given individual to allow for effective averaging of variance tolerance over time and effective discards of erroneous prints. U.S. Pat. No. 6,519,561 discusses another example of a model adaptation system that can adapt models to track aging of a user's voice. U.S. Patent Application Publication No. 2004/0122669 also discusses a particular technique for adapting reference templates with a weighted interpolation of the stored data and corresponding data from a test utterance.

However, in such known systems, it is difficult to effectively exclude fraudsters from affecting the effectiveness of this mechanism. Moreover, the effectiveness and robustness of the system deteriorates where an individual does not make regular contact with the system, resulting in undesirable false rejections due to biometric drifting beyond the predefined expected system thresholds.

What is desired is an improved system and method for biometric verification with adaptable models that enables effectiveness and robustness for all users irregardless of the frequency of engagement with the verification system.

SUMMARY OF THE INVENTION

According to one aspect of the present invention, a method is provided for biometric identity verification. A database of registered users is stored on a computing device, including data identifying profile attributes of each registered user and a respective plurality of stored biometric signatures. Each stored biometric signature is associated with a corresponding one or more of the profile attributes of each registered user, deriving a predicted biometric signature for a requesting user when it is determined that a period of time has elapsed since the requesting user's stored biometric signature was last updated. This is achieved by adapting the stored biometric signature based on biometric variances derived from a biometric peer group of registered users with at least one profile attribute in common with the requesting user. The predicted biometric signature is then used to verify the identity of the requesting user.

The biometric signature may include one or more facial profiles, and/or one or more voice prints. A new voice print may be derived from a captured voice sample.

The biometric signature may comprise an index vector including a list of numerical code elements, each code element corresponding to an aspect of the biometric profile. A list of variance values may be calculated based on a respective plurality of index vectors of stored biometric signatures that are retrieved for each registered user in the identified group of registered users. The variance values may be calculated as a mean distance between corresponding code elements of the respective plurality of index vectors. The retrieved plurality of index vectors for each registered user in the identified group of registered users may comprise a first index vector with at least one attribute matching the requesting user's new biometric signature, and a second index vector with at least one attribute matching the requesting user's present profile.

The method may further comprise the step of receiving data representative of one or more present profile attributes from the requesting user. The stored biometric signature of the requesting user may be adapted by combining respective variance values from the list of variance values with corresponding code elements in the index vector of the stored biometric signature.

The database of registered users may be processed to determine a plurality of discrete groups of registered users having at least one profile attribute in common. Classification data may be stored for identifying the determined plurality of discrete groups. The method may identify one or more of the discrete groups that shares the greatest number of profile attributes with the requesting user.

The new biometric signature may be stored in the database after the identity of the requesting user is verified. The method may further comprise the step of comparing the new biometric signature with biometric signatures of a predefined group of known fraudsters.

The requesting user's identity may be verified by calculating a Euclidean distance between the new biometric signature, with the adapted biometric signature, and determining that the calculated distance is within a predetermined threshold. The predetermined threshold may be tuned based on the calculated at least one variance value.

The method may further comprise the step of identifying the last time the requesting user contacted the system. A registered user's biometric signature may be iteratively updated based on voice-based interactions by the registered user with the system.

The identity of a registered user may be further verified based on a six factor authentication consisting identification data representative of something the system predicts, something the system finds out, something the system infers, something the user is, something the user knows, and something the user has.

A network gateway module may be provided to handle interactions with a computing device and a computer telephony integration module may be provided to handle interactions with a telephone.

According to another aspect, the present invention provides a system for performing the above methods.

In other aspects, there is provided a computer program arranged to carry out the method when executed by suitable programmable devices, and a non-transitory storage medium comprising the computer program.

BRIEF DESCRIPTION OF THE DRAWINGS

There now follows, by way of example only, a detailed description of embodiments of the present invention, with references to the following figures identified below.

DETAILED DESCRIPTION OF THE INVENTION

Figure 1:
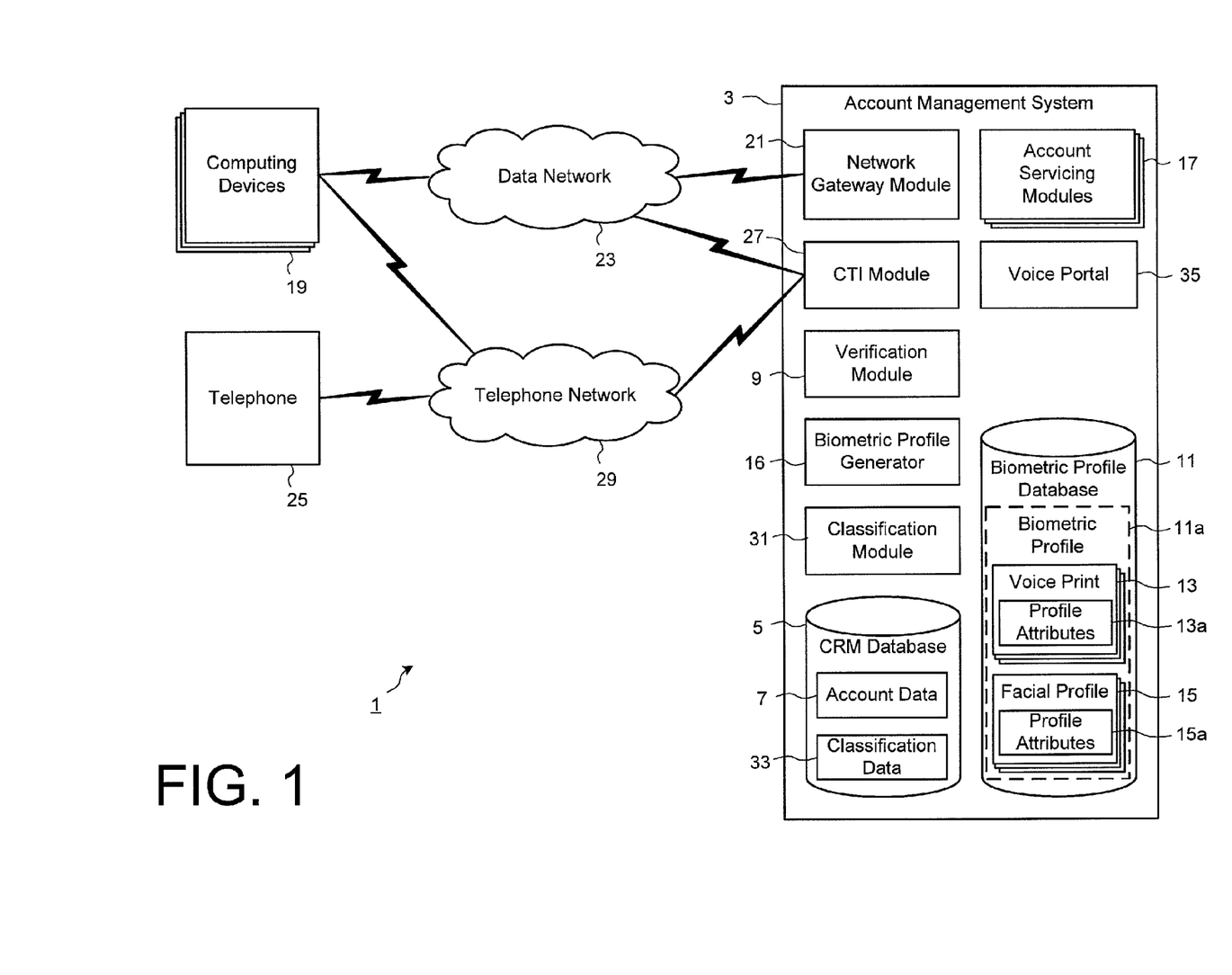
FIG. 1 is a block diagram showing the main components of an account management system according to an embodiment of the invention.

A specific embodiment of the invention will now be described for a process of user verification using adaptive biometric profiles. Referring to FIG. 1, an account management environment 1 according to an embodiment comprises an account management system 3 including a Customer Relationship Management database 5 storing account data 7 associated with a plurality of user accounts. In an embodiment, the account management system 3 is associated with a financial institution and the user accounts associated with the account data 7 of the Customer Relationship Management database 5 are financial accounts associated with funds that are accessible by the registered account holder after verification of the account holder's identity by a verification module 9. However, it will be apparent that the described techniques are applicable to any type of system that involves user verification based on biometric profiles.

The verification module 9 performs verification of an account holder identity based on biometric profile data 11a associated with the account data 7. The biometric profile data is stored in a biometric profile database 11. Each registered user's biometric profile 11a includes one or more biometric signatures, such as one or more voice prints 13 derived from captured voice data from the account holder, and/or one or more facial profiles 15 derived from captured image data. As is known in the art, a voice print 13 can be defined as a mathematically described set of speech characteristics of a human voice, such as frequency, pitch, speed, word pronunciation, dialect, etc. A biometric profile generator 16 can process a sample of the user's voice data, using any known technique, to create a unique description (voice print 13) for that particular user's voice that can be used to authenticate the identity of the user. Similarly, a facial profile 15 can be defined as a mathematically described set of visual characteristics of a human face, such as relative position, size and/or shape of the eyes, nose, cheekbones, jaw, etc., skin color, shade or tone, etc., derived by the biometric profile generator 16 by processing image data of the user's face, using any known technique.

Each individual voice print 13 and facial profile 15 is associated with a respective one or more profile attributes 13a, 15a, that identify a corresponding state of the registered user at the time the respective biometric signature was created and stored in the database 11. The profile attributes 13a, 15a include data representative of the registered user, such as sex (male, female), age or age range, geographical demographic (e.g. ethnic origin, place of residence, place of birth), profession/career, social/personal interests (e.g. gym membership), etc. In this embodiment, a typical registered user's biometric profile 11a includes a plurality of voice prints 13, each associated with a respective set of profile attributes. For example, an initial voice print generated and stored on enrollment with the account management system 3 would include a first age attribute, and a subsequent voice print updated and stored after successful verification by the verification module 9 at some time after enrollment, would include a second age attribute. The account management system 3 can be configured to store all biometric signatures from all interactions by the registered user with the system, together with associated original voice recordings as captured and processed by the biometric profile generator 16, to enable re-analysis as the analysis techniques improve over time.

Optionally, the verification module 9 can be configured to carry out additional forms of user identification and verification (ID&V), such as typical ID&V mechanisms based on challenge questions and response validation of the account or associated card number, Personal Identification Number (PIN) and/or secret word. As another example, the verification module 9 can be configured to perform enhanced verification based on a six factor authentication process. In addition to the typical three factors of:

'something you are': e.g. biometric authentication
'something you know': e.g. password, PIN, date of birth, etc.
'something you have': e.g. authentication token such as a credit card or RSA SecurID token, mobile phone, etc.

the verification module 9 can require the following additional three factors of:

'something the system predicts': e.g. regular behaviors, associative behaviors
'something the system finds out': e.g. intentions posted on a social network, such as Facebook, Twitter, LinkedIn.
'something the system infers': e.g. group behaviors and dynamics such as splitting a bill/check.

As described in more detail below, the verification module 9 in one embodiment is configured to adapt the stored voice prints 13 to reflect predicted or expected changes to the user's voice, based on patterns and/or characteristics that are identified from voice prints of a matching biometric peer group of registered users. Instead of relying on adaptation of the user's voice print from periodic and regular interactions by that particular user over time, the system 3 leverages the availability and secured accessibility to profile attributes stored and/or derived from account data 7, together with associated voice prints 13 of other registered users who do have regular contact with the system 3, to facilitate indirect and robust updating of a particular user's voice print 13 based on predicted or expected changes to the voice print.

The account management system 3 also includes one or more account servicing modules 17 for facilitating access to the financial accounts and servicing of the account data 7 by the respective verified account holders, for example to retrieve and update address and telephone contact details, retrieve account balances, instruct transactions from the accounts, or the like. The account management system 3 may also be configured to store and/or maintain supplemental data associated with or indexed to a user's account, for example:

social media/network or media events, commonly referred to as a news feed,
contact history, such as logged interactions with customer services agents or self-service enabled channels,
fraudulent transaction history, which can include flagged events and remediation action,
failed customer services channel log-in/access attempts,
historical collections details, such as bad debt logs and missed payments,
contact preferences (SMS, email, twitter, Facebook, mobile phone, video call),
outbound campaign details, which can be collections or fraud related, or related to suspected/identified conditions of the account holder, such as an ailment or death.

The registered account holders access the various account servicing modules 17 from computing devices 19, such as a personal computer, a laptop, a computing terminal, a smart phone, a tablet computer, or the like, in electronic communication with a network gateway module 21 of the account management system 3 via a data network 23. The data network 23 is any suitable data communication network such as a wireless network, a local- or wide-area network including a corporate intranet or the Internet, using for example the TCP/IP protocol, or a cellular communication network such as Global System for Mobile Communications (GSM), General Packet Radio Service (GPRS), Code Division Multiple Access (CDMA), CDMA2000, Enhanced Data Rates for GSM Evolution (EDGE), Evolved High-Speed Packet Access (HSPTA+), Long Term Evolution (LTE), etc.

In this embodiment, the registered account holders access the account servicing modules 17 through a telephone 25 connected to a Computer Telephony Integration (CTI) module 27 of the account management system 3 that facilitates interactions between the telephone 25 and the account management system 3 via a telephone network 29, such as a public switched telephone network (PSTN). As is known in the art, the Computer Telephony Integration module 27 can be configured to handle interactions with a caller using interactive voice response (IVR) technology and to route telephone calls to one or mote servicing modules 17.

The account management system 3 also includes a classification module 31 coupled to the Customer Relationship Management database 5 for processing the stored account data 7 associated with registered account holders to identify distinct groups of users sharing one or more profile attributes in common. The classification module 31 is also configured to identify patterns, trends and/or correlations in disparate data types, that can be used over time to improve identification of groups of individuals who make regular contact with the account management system 3 and that exhibit similar biometric drift patterns. Classification/grouping techniques are known in the art, such as complex event processing (CEP) utilizing machine learning to generate and update CEP system rules, and need not be described further.

The derived classification data 33 identifying the distinct biometric peer groups of registered users can also be stored in the Customer Relationship Management database 5. Additionally or alternatively, the classification module 31 may be configured to dynamically infer the distinct groups from the data associated with all individuals stored in the Customer Relationship Management database 5.

The account management system 3 also includes a voice portal module 35 coupled to the Computer Telephony Integration (CTI) module 27 for capturing voice data from telephone calls by account holders to the account management system 3, for example when calls are made to engage services provided by the account management system 3 via the Computer Telephony Integration module 27, or when voice responses are received in response to verification challenges by the verification module 9. The voice portal module 35 may also be coupled to the network gateway module 21 to capture voice data received from a computing device 19, for example via a microphone (not shown). Optionally, the voice print data 13 can also maintained by the voice portal module 35, for example by iteratively updating the voice prints 12 based on further voice-based interactions by that registered account holder with any services provided by the financial institution, thereby further reducing biometric divergence of the stored biometric profile 11 over time.

Figure 2:
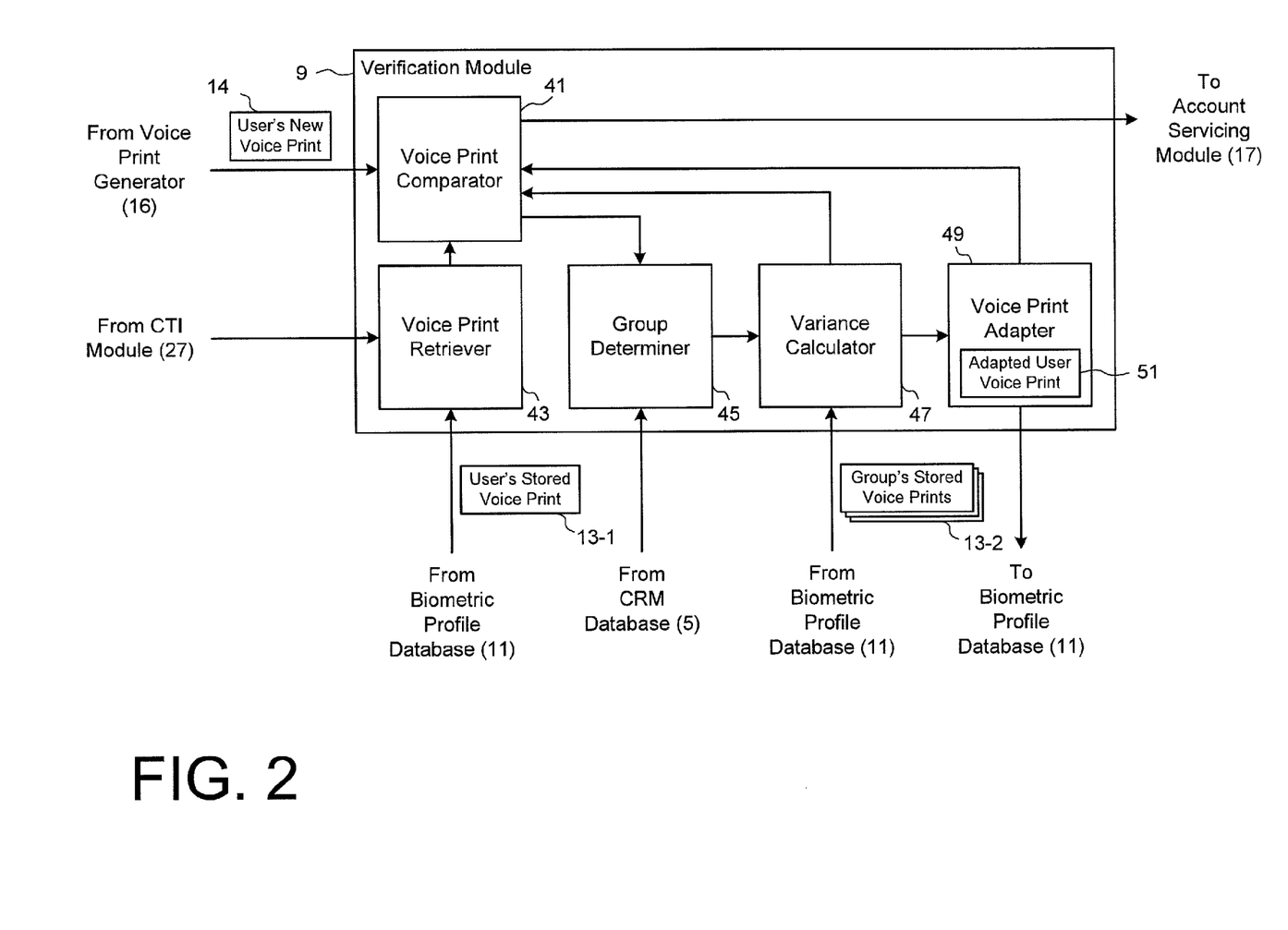
FIG. 2 is a block diagram illustrating the main functional elements of the verification module of FIG. 1, according to an embodiment.

FIG. 2 is a block diagram illustrating the main functional elements of the verification module 9 according to the present embodiment, for processing a request to verify the identity of a registered user based on a respective stored biometric profile 11a, before allowing access to the user's account via the account servicing modules 17. As shown in FIG. 2, the verification module 9 includes a voice print comparator 41 that receives a new voice print 14 from a caller who is a registered user of the system 3. The user's new voice print 14 may be generated by the voice print generator 16 from a sample of the caller's voice captured by the Computer Telephony Integration module 27. The voice print comparator 41 compares the user's new voice print 14 with the user's stored voice print 13-1, retrieved from the biometric profile database 11 by a voice print retriever 43. The voice print retriever 43 can retrieve the user's most recent voice print 13-1 if there is more than one voice print 13 stored in the biometric profile 11a. The user may be identified by data received via voice and/or telephone keypad interactions with the Computer Telephony Integration module 27, as is known in the art.

As will be described below in greater detail, the verification module 9 in this embodiment is configured to determine if the user's new voice print 14 is received from a user who is an infrequent caller, for example from stored data in the Customer Relationship Management database 5 identifying the last time the user contacted the account management system 3 or by determining that the user's stored voice print 13a is "stale" as it has not been verified or updated for a predetermined period of time. When the voice print comparator 41 determines that the user has not been in contact for at least a predetermined period of time, a group determiner 45 attempts to identify a biometric peer group that best fits the user. For example, the group determiner 45 can determine, from the classification data 33 in the Customer Relationship Management database 5, which one of the identified group's shares the most classification attributes with the registered user (the best fitting biometric peer group).

Once a matching biometric peer group is identified, a variance calculator 47 calculates an expected or predicted biometric variance for the registered user's voice print, based on stored voice prints 13b of each registered user in the group, retrieved from the biometric profile database 11. For example, the variance calculator 47 can apply cumulative learning techniques to the retrieved voice prints 13b for the identified group to generate a predicted base-line pattern, for comparison with the group's voice prints 13b to calculate the biometric variances from respective deltas and/or a mean average. The calculated variance is then used by a voice print adapter 49 to create an adapted (predicted) voice print 51, which is passed to the voice print comparator 41 for comparison with the user's new voice print 14, whereby a match distance is measured between the user's new voice print 14 and the predicted biometric voice print 51, rather than from the "stale" stored voice print 13a.

Alternatively or additionally, the calculated variances may be used to set greater tolerances for voice print matching by the voice print comparator 41. The tolerances for the voice print attributes can be dynamically set to improve match confidence and/or reduce chance of false rejection. The calculated variance for an identified group's voice prints 13b can also be applied to other logical members of the same group, in particular for identified users in the group that also do not make regular contact with the account management system 3.

The best fit biometric peer group can be dynamically designated by the group determiner 45 at the time of the contact by the caller. The identified group can be further modified to remove those registered users that do not share defined key attributes. Refinement of the group may cease at a point before insufficient trends and stored patterns exist to make an accurate prediction.

It will be appreciated that the verification module 9 illustrated in FIG. 2 is described as processing user verification based on comparison of a user's voice print, but the technique of calculating biometric variances based on biometric data of users in an identified biometric peer group can be extended to other forms of biometric signatures, such as facial features. Additionally, biometric similarity (closeness) at a point of last contact may correlate facial profiles 15 and voice prints 13 where both are available.

A brief description has been given above of the components forming part of the account management system 3 and particularly the verification module 9 of an embodiment. A more detailed description of the operation of these components will now be given with reference to the flow diagram of FIG. 3 for an exemplary computer-implemented voice print verification and adaptation process using the verification module 9.

Figure 3:
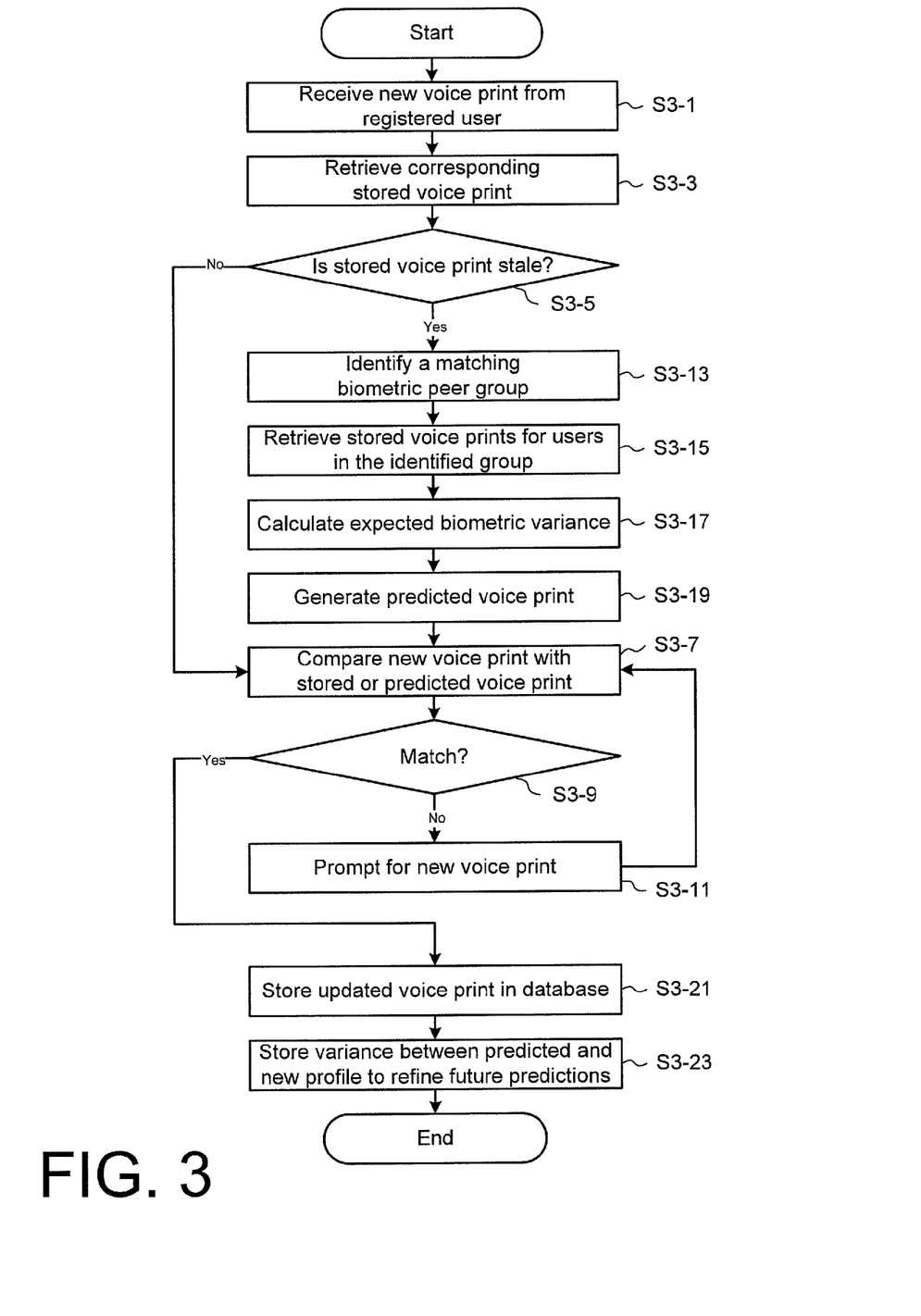
FIG. 3 is a flow diagram illustrating the main processing steps performed by the verification module of FIG. 2 for a biometric verification process according to an embodiment.

As shown in FIG. 3, the process begins at step S3-1 where the verification module 9 receives a new voice print 14 from the registered user. As described above, the user's new voice print 14 is derived from voice data of the user captured by the voice portal 35. The audio data is captured from call data when the user connects to the account management system 3 using a telephone 21 via the Computer Telephony Integration module 27. Alternatively, the Computer Telephony Integration module 27 can be configured to prompt the caller for spoken responses in order to capture sufficient voice data for the biometric profile generator 16 to derive the new voice print 14. The Computer Telephony Integration module 27 also provides user identifier data to the verification module 9 that identifies the caller as a registered user of the system 3, for example based on unique data (account number, contact details, etc.) received from the caller via voice and/or telephone keypad interactions with the Computer Telephony Integration module 27.

At step S3-3, the voice print retriever 43 retrieves the stored voice print 13-1 for the identified user from the biometric profile database 11. At step S3-5, the voice print comparator 41 determines whether the retrieved voice print has been verified or updated within a predetermined period of time, or if the voice print is otherwise "stale". Additionally or alternatively, the voice print comparator 41 may determine from stored account data 7 that the user has made contact with the system 3 within the predetermined period of time. If the stored voice print is determined not to be stale, then the voice print comparator 41 proceeds to compare the user's new voice print 14 with the retrieved stored voice print 13-1 at step S3-7, and to determine at step S3-9 if the voice prints match.

In this exemplary embodiment, the biometric profile data (e.g. facial profile or voice print) is modeled as an index vector, which is a list of numerical codes, with the code at each index assigning a value to one aspect of the biometric profile. In Example 1 set out below, a simple version of an index vector of a registered user's stored voice print includes eight integer values, each corresponding to a respective aspect, feature and/or characteristic of the user's voice:

| 98 | 20 | 0 | 10 | 34 | 7 | 3 | 15 |
|----|----|---|----|----|---|---|----|

Example 1: Sample Voice Print Index Vector

Typically, a voice print comparator 41 may determine a match by calculating a distance between the index vector of the user's new voice print 14 and the index vector of the user's stored voice print 13-1 using a suitable distance function, such as the Euclidean (spatial) distance, and comparing the calculated distance to a predetermined acceptability or allowance threshold.

Continuing from Example 1 above, Example 2 sets out a comparison of the user's exemplary stored voice print 13-1 to an exemplary received new voice print 14.

Example 2—Comparison of Index Vectors for Stored and New Voice Prints

Stored Voice Print:

| 98 | 20 | 0 | 10 | 34 | 7 | 3 | 15 |
|----|----|---|----|----|---|---|----|

New Voice Print:

| 95 | 22 | 0 | 13 | 32 | 9 | 3 | 17 |
|----|----|---|----|----|---|---|----|

In this example, the Euclidean distance can be calculated as:

$$\sqrt{((98-95)^2 + (20-22)^2 + (0-0)^2 + (10-13)^2 + (34-32)^2 + (7-9)^2 + (3-3)^2 + (15-17)^2)} = \sqrt{34} = 5.830952.$$

The voice print comparator 41 compares the calculated Euclidean distance with a predetermined threshold value to determine if the difference is within an acceptable or allowable margin. For example, if the allowed threshold Euclidean distance between stored and new biometric profiles is set to "3", then the voice print comparator 41 determines that the new voice print 14 in Example 2 above does not match the stored voice print 13a. If it is determined that the voice prints do not match, then at step S3-11, the verification module 9 prompts the caller for new voice sample, via the Computer Telephony Integration module 27, and processing returns to step S3-7 once a replacement new voice print 14 is obtained from the new voice sample. Alternatively or additionally, the verification module 9 can be configured to reject the caller based on one or more failed attempts to verify the new voice print 14. On the other hand, if the voice print comparator 41 determines at step S3-9 that the voice prints do match, then a successful verification result can be provided to a requesting account servicing module 17.

As another example, the inventors have appreciated that the voice print 13 of a caller who regularly contacts the account management system 3 is consequently incrementally updated, whereby the calculated distance between stored 13-1 and new voice prints 14 has not been large enough to cause a, false rejection at each verification point in time. Examples 3, 4 and 5 below set out a sequence of stored voice prints 13-1 for three exemplary callers over time, from an initial voice print registered when each caller was 25 years old, followed by subsequent successful verification points at ages 27, 32 and 35, resulting in incremental updates to the respective stored voice print 13-1 that compensate for the biometric drift as the caller's biometric profile changes from natural physical changes in the subject over time.

Example 3—Sequence of Stored Voice Prints for Exemplary User a Over Time

Aged 25:

| 98 | 20 | 0 | 10 | 34 | 7 | 3 | 15 |
|----|----|----|----|----|----|----|----|

Aged 27:

| 98 | 20 | 0 | 12 | 34 | 7 | 3 | 14 |
|----|----|----|----|----|----|----|----|

(Euclidean distance between index vectors at ages 25 and 27=2.236068)

Aged 32:

| 98 | 20 | 0 | 13 | 34 | 7 | 3 | 13 |
|----|----|----|----|----|----|----|----|

(Euclidean distance between index vectors at ages 27 and 32=1.414214)

Aged 35:

| 98 | 20 | 0 | 14 | 34 | 7 | 3 | 12 |
|----|----|----|----|----|----|----|----|

(Euclidean distance between index vectors at ages 32 and 35=1.141214)

Example 4—Sequence of Stored Voice Prints for Exemplary Caller B Over Time

Aged 25:

| 95 | 25 | 5 | 14 | 38 | 8 | 4 | 17 |
|----|----|----|----|----|----|----|----|

Aged 27:

| 95 | 25 | 5 | 16 | 38 | 8 | 4 | 16 |
|----|----|----|----|----|----|----|----|

(Euclidean distance between index vectors at ages 25 and 27=2.236068)

Aged 32:

| 95 | 25 | 5 | 17 | 38 | 8 | 4 | 15 |
|----|----|----|----|----|----|----|----|

(Euclidean distance between index vectors at ages 27 and 32=1.414214)

Aged 35:

| 95 | 25 | 5 | 18 | 38 | 8 | 4 | 14 |
|----|----|----|----|----|----|----|----|

(Euclidean distance between index vectors at ages 32 and 35=1.141214)

Example 5—Sequence of Stored Voice Prints for Exemplary Caller C Over Time

Aged 25:

| 99 | 27 | 3 | 4 | 45 | 12 | 8 | 20 |
|----|----|----|----|----|----|----|----|

Aged 27:

| 99 | 27 | 3 | 5 | 45 | 12 | 8 | 18 |
|----|----|----|----|----|----|----|----|

(Euclidean distance between index vectors at ages 25 and 27=2.236068)

Aged 32:

| 99 | 27 | 3 | 5 | 45 | 12 | 8 | 17 |
|----|----|----|----|----|----|----|----|

(Euclidean distance between index vectors at ages 27 and 32=1)

Aged 35:

| 99 | 27 | 3 | 6 | 45 | 12 | 8 | 16 |
|----|----|----|----|----|----|----|----|

(Euclidean distance between index vectors at ages 32 and 35=1.141214)

As can be seen from the above Examples 3, 4 and 5, at each verification point, the Euclidean distance between successive voice prints 13 is below the example threshold value of "3". To the contrary, if any one of the exemplary users was instead an irregular caller, making contact with the account management system 3 for the first time at age 35, since first registering at age 25, then the Euclidean distance calculated between the index vectors at ages 25 and 35 would be greater than the threshold value, and the voice print comparator 41 would determine that the user's new voice print 14 does not match the user's "stale" stored voice print 13*a*. For example, the Euclidean distance between the index vectors for exemplary users A at ages 25 and 35 is 5, the Euclidean distance between the index vectors for exemplary user B at ages 25 and 35 is also 5, and the Euclidean distance between the index vectors for exemplary user C at ages 25 and 35 is 4.472136.

Returning back to step S3-5, if the voice print comparator 41 determines that the user's stored voice print 13-1 is stale and/or that the user has not made contact with the system 3 for a predetermined period of time, then the verification module 9 proceeds to derive an updated, predicted, voice print 51 for the user based on an identified representative group of registered users having associated account data 7 that share similar biometric drift trends/patterns (the identified biometric peer group). Accordingly, at step S3-13, the group determiner 45 identifies a matching biometric peer group, for example based on the classification data 33 stored in the Customer Relationship Management database 5 or dynamically derived by the classification module 31.

At step S3-15, the variance calculator 47 retrieves stored voice prints 13-2 for each registered user in the identified group that have associated profile attributes matching the user's stored voice print 13-1. The variance calculator 47 also retrieves stored voice prints 13-2 for each registered user in the identified group that have associated profile attributes matching the irregular caller's present profile. At step S3-17, the variance calculator 47 calculates an expected biometric variance for the irregular caller's stored voice print 13-1, based on the retrieved voice prints 13-2 of the registered users in the identified biometric peer group. For example, the mean distance between the index vectors of members of the identified biometric peer group is used to enhance the verification success of a caller with the same profile who has not "called in" for a predetermined period of time. Accordingly, at step S3-19, the voice print adapter 49 generates a predicted voice print 51 for the irregular caller, by applying the calculated expected biometric variance to the user's "stale" stored voice print 13-1. Processing then proceeds to step S3-7, where the voice print comparator 41 compares the irregular caller's new voice print 14 to the predicted voice print 51 generated by the voice print adapter 49, to determine if the voice prints are a match as discussed above. The voice print adapter 49 can also store the adapted user voice print 51 of the now verified user as an updated version of the user's voice print 13 in the biometric profile database 11, at step S3-21, in preparation for the next call from the user.

Optionally, the voice print adapter 49 can also store the calculated variances between predicted and new biometric profiles in the classification data 33 of the Customer Relationship Management database 5, as illustrated at step S3-23, to refine future predictions and classifications by the classification module 31.

Following from the above examples, the classification module 31 may identify that the exemplary regular users A, B and C have the following profile attributes and are determined to have experienced similar biometric drift since first enrolling with the system 3, namely a 35 year old male, living in the south east of England, with a gym membership, and spending between 50-100 pounds a month on non-supermarket food purchases. Therefore, the classification module 31 stores classification data 33 that defines a biometric peer group consisting of exemplary users A, B and C.

When exemplary irregular caller D contacts the account management system 3, the verification module 9 retrieves caller D's present profile from the Customer Relationship Management database 5 and/or prompts irregular caller D for present attributes to update the user's profile. In this example, caller D is also a 35 year old male, living in the south east of England, with a gym membership, who spends between 50-100 pounds a month on non-supermarket food purchases. The verification module 9 also retrieves and determines that the stored voice print 13-1 for caller D is associated with the user's profile on initial enrollment with the system at age 25 and is therefore stale as it has not been updated for 10 years (over an exemplary threshold window of 1 year).

Consequently, the group determiner 45 identifies the matching biometric peer group consisting of exemplary users A, B and C, sharing the same set of profile attributes with irregular caller D. The variance calculator 47 retrieves the stored index vectors 13-2 for the group members corresponding to the respective user's voice print at age 25 (i.e. the group members' voice prints that best match the irregular caller's stored voice print 13-1), as well as the stored index vectors 13-2 for the group members corresponding to the respective user's voice print at age 35 (i.e. the group members' voice prints that best match the irregular caller's present profile). The retrieved index vectors for the exemplary group's voice prints are as set out below in Example 6.

Example 6—Retrieved Stored Voice Prints for Identified Biometric Peer Group

Exemplary User A, Aged 25:

| 98 | 20 | 0 | 10 | 34 | 7 | 3 | 15 |
|---|---|---|---|---|---|---|---|

Exemplary User A, Aged 35:

| 98 | 20 | 0 | 14 | 34 | 7 | 3 | 12 |
|---|---|---|---|---|---|---|---|

Exemplary User B, Aged 25:

| 95 | 25 | 5 | 14 | 38 | 8 | 4 | 17 |
|---|---|---|---|---|---|---|---|

Exemplary User B, Aged 35:

| 95 | 25 | 5 | 18 | 38 | 8 | 4 | 14 |
|---|---|---|---|---|---|---|---|

Exemplary User C, Aged 25:

| 99 | 27 | 3 | 4 | 45 | 12 | 8 | 20 |
|---|---|---|---|---|---|---|---|

Exemplary User C, Aged 35:

| 99 | 27 | 3 | 6 | 45 | 12 | 8 | 16 |
|---|---|---|---|---|---|---|---|

The variance calculator 47 then calculates the expected biometric variance for the irregular caller's stored voice print 13-1, by determining the mean distance between corresponding code elements of the index vectors for the group members at ages 25 and 35. Example 7 below sets out the calculated variances for the retrieved index vectors in Example 6.

Example 7—Mean Biometric Variance for Identified Biometric Peergroup

Variance Between Exemplary User A, Aged 25 and Aged 35:

| 0 | 0 | 0 | 3 | 0 | 0 | 0 | −3 |
|---|---|---|---|---|---|---|---|

Variance Between Exemplary User B, Aged 25 and Aged 35:

| 0 | 0 | 0 | 4 | 0 | 0 | 0 | −3 |
|---|---|---|---|---|---|---|---|

Variance Between Exemplary User C, Aged 25 and Aged 35:

| 0 | 0 | 0 | 2 | 0 | 0 | 0 | −4 |
|---|---|---|---|---|---|---|---|

Mean Biometric Variance for the Group, Rounded to the Nearest Integer:

| 0 | 0 | 0 | 3 | 0 | 0 | 0 | −3 |
|---|---|---|---|---|---|---|---|

The voice print adapter 49 then applies the calculated biometric variance for the identified biometric peer group to the user's "stale" stored voice print 13-1 to generate a predicted voice print 51. Example 8 below sets out the exemplary predicted voice print 51 that is generated for irregular caller D using the mean biometric variance in Example 7.

Example 8—Generation of Predicted Voice Print for Irregular Caller D

Stale Voice Print for Irregular Caller D, Aged 25:

| 89 | 29 | 4 | 9 | 42 | 5 | 12 | 25 |
|----|----|---|---|----|---|----|----|

Expected Biometric Variance Calculated for the Identified Biometric Peer Group:

| 0 | 0 | 0 | 3 | 0 | 0 | 0 | −3 |
|---|---|---|---|---|---|---|----|

Predicted Voice Print for Irregular Caller D, Aged 35:

| 89 | 29 | 4 | 12 | 42 | 5 | 12 | 22 |
|----|----|---|----|----|---|----|----|

Example 9 below sets out the comparison of irregular caller D's exemplary new voice print 14 to the predicted voice print 51 in Example 8.

Example 9—Comparison of New and Predicted Voice Prints for Irregular Caller D

Irregular Caller D's New Voice Print:

| 88 | 30 | 4 | 11 | 42 | 5 | 12 | 23 |
|----|----|---|----|----|---|----|----|

Predicted Voice Print for Irregular Caller D, Aged 35:

| 89 | 29 | 4 | 12 | 42 | 5 | 12 | 22 |
|----|----|---|----|----|---|----|----|

In this example, the Euclidean distance between irregular caller D's predicted voice print 51 and the new voice print is 2, which is below the exemplary threshold of 3. Accordingly, the voice print comparator 41 determines that irregular caller's new voice print 14 and the adapted, predicted, user voice print 51 match, and allows the irregular caller to pass verification.

To the contrary, had the voice print comparator 41 compared irregular caller D's new voice print 14 to the stale stored voice print 13-1, as illustrated in Example 10 below, the calculated Euclidian distance is not within the exemplary threshold of 3 and so the caller would have been rejected.

Example 10—Comparison of New and Stale Voice Prints for Irregular Caller D

Irregular Caller D's New Voice Print:

| 88 | 30 | 4 | 11 | 42 | 5 | 12 | 23 |
|----|----|---|----|----|---|----|----|

Stale Voice Print for Irregular Caller D, Aged 25:

| 89 | 29 | 4 | 9 | 42 | 5 | 12 | 25 |
|----|----|---|---|----|---|----|----|

(Euclidian distance between index vectors of new and stale voice prints=3.162278)

A number of advantages will be understood from the above description of the embodiments of the present invention.

In particular, the integration of predictive trend analysis and CRM profiling with biometric identification and verification technologies prevents false rejection of an individual who has simply "aged" since last making contact. Moreover, a fraudulent individual's biometric profile is prevented from affecting a legitimate individual's stored biometric signatures.

Additionally, the embodiments allow an organization to continually improve biometric identification/verification success rates for infrequent contacts based on the data captured for more frequent contacts within the same biometric group. In particular, the generation of a predicted biometric print can be used in conjunction with a stored print generated during a previous contact to improve identification/verification success rates.

Moreover, use of complex event processing and trend analysis facilitates categorization of similar biometric individuals, and identified trends in biometric pattern divergence between stored prints and new or "live" data can be used to predict expected or most likely changes for individuals whose stored details may otherwise be considered "stale".

Embodiments also allow aspects of a biometric profile to be associated with dynamic tolerance thresholds (tuning) based on identified trends within a biometric peer group.

Figure 4:
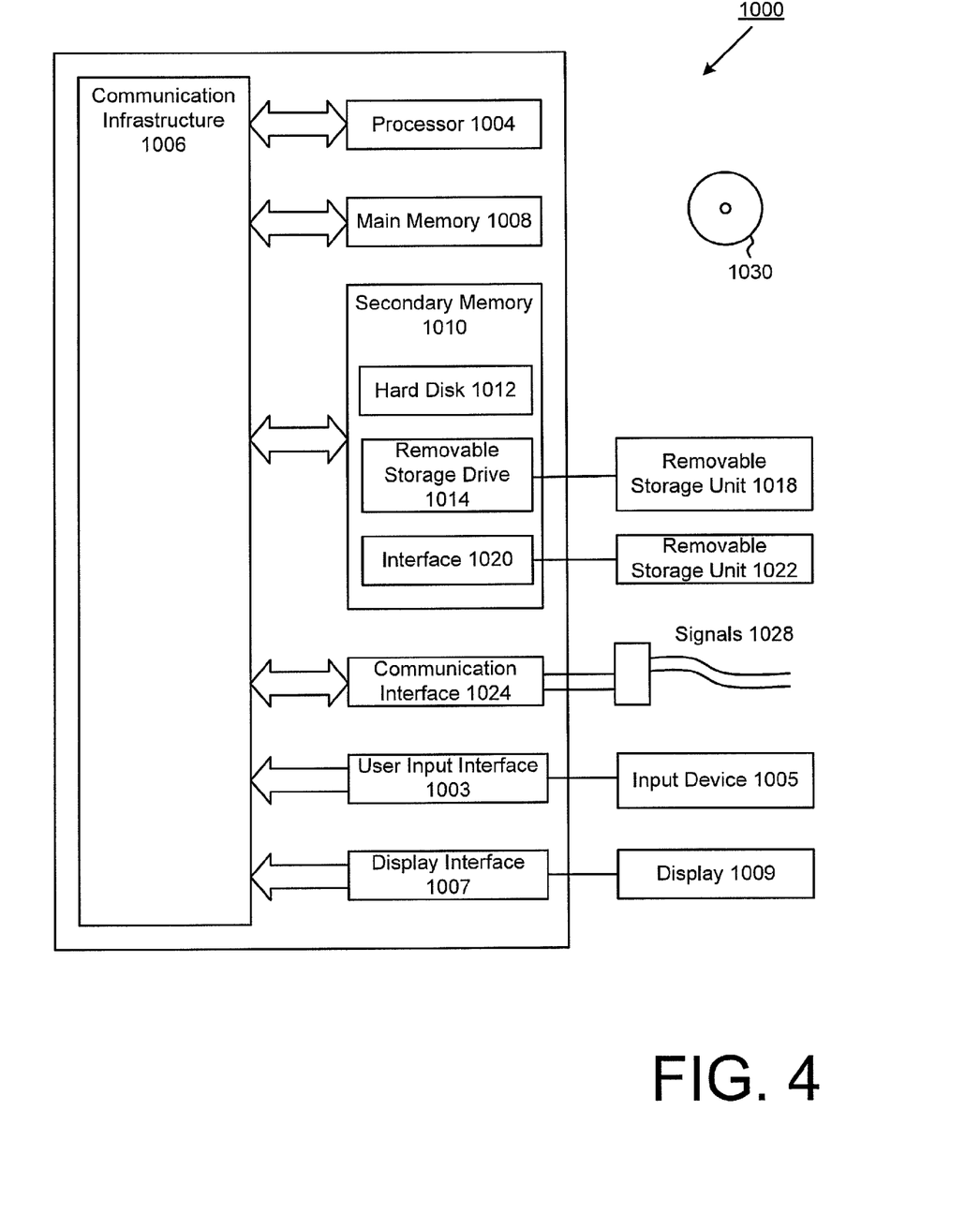
FIG. 4 is a diagram of an example of a computer system on which one or more of the functions of the embodiments may be implemented.

The account management system described herein may be implemented by one or more computer systems such as a computer system 1000 as shown in FIG. 4. Embodiments of the present invention may be implemented as programmable code for execution by such computer systems 1000. After reading this description, it will become apparent to a person skilled in the art how to implement the invention using other computer systems and/or computer architectures.

The computer system 1000 includes one or more processors, such as a processor 1004. The processor 1004 may be any type of processor, including but not limited to a special purpose or a general-purpose digital signal processor. The processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

The computer system 1000 also includes a user input interface 1003 connected to one or more input device(s) 1005 and a display interface 1007 connected to one or more display(s) 1009. The input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

The computer system 1000 also includes a main memory 1008, preferably random access memory (RAM), and may also include a secondary memory 610. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. The removable storage unit 1018 represents a floppy disk, magnetic tape, optical disk, etc., which is read by and written to by the removable storage drive 1014. As will be appreciated, the removable storage unit 1018 includes a computer usable storage medium having stored therein computer software and/or data.

In alternative implementations, the secondary memory 1010 may include other similar means for allowing computer programs or other instructions to be loaded into the computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from the removable storage unit 1022 to the computer system 1000. Alternatively, the program may be executed and/or the data accessed from the removable storage unit 1022, using the processor 1004 of the computer system 1000.

The computer system 1000 may also include a communication interface 1024. The communication interface 1024 allows software and data to be transferred between the computer system 1000 and external devices. Examples of the communication interface 1024 may include a modem, a network interface (such as an Ethernet card), a communication port, a Personal Computer Memory Card International Association (PCMCIA) slot and card, etc. Software and data transferred via the communication interface 1024 are in the form of signals 1028, which may be electronic, electromagnetic, optical, or other signals capable of being received by the communication interface 1024. These signals 1028 are provided to the communication interface 1024 via a communication path 1026. The communication path 1026 carries signals 1028 and may be implemented using wire or cable, fibre optics, a phone line, a wireless link, a cellular phone link, a radio frequency link, or any other suitable communication channel. For instance, the communication path 1026 may be implemented using a combination of channels.

The terms "computer program medium" and "computer usable medium" are used generally to refer to media such as the removable storage drive 1014, a hard disk installed in the hard disk drive 1012, and the signals 1028. These computer program products are means for providing software to the computer system 1000. However, these terms may also include signals (such as electrical, optical or electromagnetic signals) that embody the computer program disclosed herein.

Computer programs (also called computer control logic) are stored in the main memory 1008 and/or the secondary memory 1010. Computer programs may also be received via the communication interface 1024. Such computer programs, when executed, enable the computer system 1000 to implement embodiments of the present invention as discussed herein. Accordingly, such computer programs represent controllers of the computer system 1000. Where the embodiment is implemented using software, the software may be stored in a computer program product 1030 and loaded into the computer system 1000 using the removable storage drive 1014, the hard disk drive 1012, or the communication interface 1024, to provide some examples.

Alternative embodiments may be implemented as control logic in hardware, firmware, or software or any combination thereof.

It will be understood that embodiments of the present invention are described herein by way of example only, and that various changes and modifications, in addition to those mentioned above, may be made without departing from the scope of the invention.

For example, in the embodiment described above, the verification module processes stored voice prints to verify the identity of a registered user in contact with the account management system using a telephone via a Computer Telephony Integration module. It will be appreciated that the techniques for adapting a stored voice print based biometric variances derived from an identified biometric peer group are applicable to other forms of biometric signatures, such as facial profiles. The described embodiment is most suited to facial and vocal biometric signatures, which can be more readily shown to change in direct relation to age. In the embodiment described above, the verification module compares voice prints based on Euclidean distances. Alternatively, the voice print comparator of the verification module can be configured to compare voice prints using any other known statistical technique, for example comparison of Hamming distances, or other multivariate distance measures such as Bray-Curtis dissimilarity, $L_1$ (Manhattan), the Jaccard index, etc.

As yet a further alternative, after the caller has been verified by the verification module, the voice print comparator may be configured to attempt to match the new voice print to one or more predefined groups of registered users, such as a group of friend or family members, and/or a group of known fraudsters, and to raise an alert to one or more account servicing modules if a match to any one of the predefined groups is identified. Additionally or alternatively, when a caller's new profile is determined not to match a predicted voice print, the verification module can determine one or more next-best fitting biometric peer groups, and/or one or more predefined groups of registered users, to repeat the described process. This will allow a number of predictions to be made based on biometric divergence over time. If the new biometric profile appears to correlate more closely with a prediction from any group other than that linked to the account being accessed, appropriate alerts can be sent and the new or live biometric signature excluded from training for the registered user's biometric profile. The new voice print may be used to train the system against future attacks. It may be possible in this way to distinguish a general threat to a financial institution (i.e. a possible new "known fraudster") and a specific threat to the individual (i.e. a family member specifically targeting that account). In this way, the nature of the threat can be more usefully categorized and appropriate action taken.

As yet a further alternative, the embodiments described above can be used in conjunction with a biometric index, allowing the greatest possibility for using a contact to re-sample individual profiles. For example, if a registered user (customer) of an enterprise (e.g. a financial institution) has multiple accounts, any contact with the enterprise, regarding any account would be used to update the same stored profile for that particular user. Further, the enterprise may allow the registered user to access affiliated services from third parties making use of the same stored profile. Advantageously, each access by the registered user to a third party service would also be used to update the stored profile, thereby reducing the likelihood of the enterprise storing a stale profile for the registered users.

What is claimed is:

1. A biometric identity verification method, comprising processor implemented steps of:
   storing a database of registered users including data identifying at least one stored biometric signature, each biometric signature associated with one or more profile attributes;
   deriving a new biometric signature for a requesting user from a response to a request for identity verification, wherein the new biometric signature is associated with a corresponding one or more present profile attributes of the requesting user;
   retrieving a stored biometric signature of the requesting user;
   determining that a predefined period of time has elapsed since the retrieved requesting user's biometric signature was last updated, and in response, adapting the retrieved requesting user's biometric signature by:
   identifying a group of registered users having a first stored biometric signature with at least one first age associated profile attribute substantially in common with the retrieved requesting user's biometric signature, and a second stored biometric signature with at least one associated second age profile attribute substantially matching the requesting user's corresponding one or more present profile attributes, wherein the first and second age profile attributes are different age values;
   calculating, for each registered user in the identified group, at least one variance value based on the first and second stored biometric signatures of the user;
   calculating at least one variance value for the identified group, based on the calculated variance values for each registered user in the identified group; and
   creating a predicted biometric signature by applying the variance value calculated for the identified group to the requesting user's stored biometric signature; and
   comparing the requesting user's new biometric signature to the predicted biometric signature to verify the identity of the requesting user.

2. The method of claim 1, wherein the stored biometric signature includes one or more facial profiles.

3. The method of claim 1, wherein the stored biometric signature includes one or more voice prints.

4. The method of claim 3, wherein the one or more voice prints are derived from captured voice samples.

5. The method of claim 1, wherein the at least one stored biometric signature comprises an index vector including a list of numerical code elements, each code element corresponding to an aspect of the data identifying profile attributes.

6. The method of claim 5, wherein a list of variance values is calculated based on a respective plurality of index vectors of the at least one stored biometric signatures that are retrieved for each registered user in the identified group of registered users.

7. The method of claim 6, wherein the variance values are calculated as a mean distance between corresponding code elements of the respective plurality of index vectors.

8. The method of claim 1, further comprising the step of receiving data representative of one or more present profile attributes from the requesting user.

9. The method of claim 7, wherein the predicted biometric signature of the requesting user is created by combining respective variance values from the list of variance values with corresponding code elements in the index vector of the stored biometric signature.

10. The method of claim 1, further comprising the step of processing the database of registered users to determine a plurality of discrete groups of registered users having at least one profile attribute in common.

11. The method of claim 10, further comprising storing classification data identifying the determined plurality of discrete groups of registered users.

12. The method of claim 10, wherein identifying the group of registered users comprises identifying one or more of the determined plurality of discrete groups that shares a greatest number of profile attributes with the requesting user.

13. The method of claim 1, further comprising the step of storing the new biometric signature in the database after the identity of the requesting user is verified.

14. The method of claim 1, further comprising the step of comparing the new biometric signature with biometric signatures of a predefined group of known fraudsters.

15. The method of claim 1, wherein verifying the identity of the requesting user comprises calculating a distance measure between the new biometric signature with the predicted biometric signature, and determining that the calculated distance is within a predetermined threshold.

16. The method of claim 15, wherein the distance measure comprises a Euclidean distance, Hamming distance, a Bray-Curtis dissimilarity, a L, (Manhattan) or a Jaccard index.

17. The method of claim 15, wherein the predetermined threshold is tuned based on the calculated at least one variance value.

18. The method of claim 1, further comprising the step of identifying the last time the requesting user contacted the system.

19. The method of claim 1, further comprising the step of iteratively updating a registered user's biometric signature based on voice-based interactions by the registered user with the system.

20. The method of claim 1, further comprising the step of verifying the identity of a registered user based on a six factor authentication consisting of identification data representative of something the system predicts, something the system finds out, something the system infers, something the user is, something the user knows, and something the user has.

21. The method of claim 1, further comprising the step of handling interactions with the computing device via a network gateway module and handling interactions with a telephone via a computer telephony integration module.

22. The method of claim 1, wherein the requesting user is a registered user.

23. A system for computer-implemented biometric identity verification, comprising:
   a biometric profile database of registered users stored on a computing device, the biometric profile database storing data identifying at least one stored biometric signature for each registered user, each stored biometric signature associated with one or more profile attributes;
   a processor;
   a memory, the memory includes instructions for a verification module that when executed by the processor cause the processor to perform verification of the identity of a requesting user, by:
   deriving a new biometric signature for the requesting user from a response to a request for identity verification, wherein the new biometric signature is associated with a corresponding one or more present profile attributes of the requesting user;

retrieving a stored biometric signature of the requesting user;

determining that a predefined period of time has elapsed since the retrieved requesting user's biometric signature was last updated, and in response, adapting the retrieved requesting user's biometric signature by:

identifying a group of registered users having a first stored biometric signature with at least one first age associated profile attribute substantially in common with the retrieved requesting user's biometric signature, and a second stored biometric signature with at least one associated second age profile attribute substantially matching the requesting user's corresponding one or more present profile attributes, wherein the first and second age profile attributes are different age values;

calculating, for each registered user in the identified group, at least one variance value based on the first and second stored biometric signatures of the user;

calculating at least one variance value for the identified group based on the calculated variance values for each registered user in the identified group; and creating a predicted biometric signature by applying the variance value calculated for the identified group to the requesting user's stored biometric signature; and comparing the requesting user's new biometric signature to the predicted biometric signature to verify the identity of the requesting user.

24. The system of claim 23, wherein the stored biometric signatures of the biometric profile database are selected from the group consisting of one or more facial profiles, and one or more voice prints.

25. The system of claim 24, wherein the one or more voice prints are derived from captured voice samples.

26. The system of claim 24, wherein the at least one stored biometric signatures of the biometric profile database comprises an index vector including a list of numerical code elements, each code element corresponding to an aspect of the data identifying profile attributes.

27. The system of claim 23, wherein the at least one variance value is calculated based on a respective plurality of index vectors of the at least one stored biometric signatures that are retrieved for each registered user in the identified group of registered users.

28. The system of claim 27, wherein the at least one variance value is calculated as a mean distance between corresponding code elements of the respective plurality of index vectors.

29. The system of claim 28, wherein the predicted biometric signature, from the biometric profile database, of the requesting user is created by combining respective variance values from the list of variance values with corresponding code elements in the index vector of the stored biometric signature.

30. The system of claim 23, further comprising receiving data representative of one or more present profile attributes from the requesting user.

31. The system of claim 23, wherein the group determiner in conjunction with the customer relationship management database determine a plurality of discrete groups of registered users having at least one profile attribute in common.

32. The system of claim 31, further comprising storing classification data identifying the determined plurality of discrete groups of registered users.

33. The system of claim 23, wherein the verification module compares the new biometric signature with biometric signatures of a predefined group of known fraudsters.

34. The system of claim 23, wherein the verification module calculates a distance measure between the new biometric signature and the predicted biometric signature, and determines that the calculated distance is within a predetermined threshold.

35. The system of claim 23, further comprising identifying the last time the requesting user contacted the system.

36. The system of claim 23, further including a voice print adapter updating a registered user's biometric signature based on voice-based interactions by the registered user with the system.

* * * * *